(12) United States Patent
Wotiz

(10) Patent No.: US 6,840,100 B1
(45) Date of Patent: Jan. 11, 2005

(54) LIQUID LEVEL INDICATOR

(76) Inventor: Richard A. Wotiz, 21170 Sullivan Way, Saratoga, CA (US) 95070

( * ) Notice: Subject to any disclaimer, the term of this patent is extended or adjusted under 35 U.S.C. 154(b) by 0 days.

(21) Appl. No.: 10/655,791

(22) Filed: Sep. 4, 2003

(51) Int. Cl.$^7$ .................. G01F 17/00; G01F 23/00; A45F 3/16; B67D 5/64

(52) U.S. Cl. .................. 73/149; 73/304 C; 224/148.1; 222/175

(58) Field of Search ................ 73/149, 304 C; 224/148.1, 148.2, 148.3, 148.4, 148.5, 148.6, 148.7; 222/175

(56) References Cited

U.S. PATENT DOCUMENTS

| | | | |
|---|---|---|---|
| 3,930,411 A | * | 1/1976 | Beeker et al. ............... 73/223 |
| 3,939,360 A | * | 2/1976 | Jackson .................. 307/118 |
| 4,002,996 A | * | 1/1977 | Klebanoff et al. ............ 331/65 |
| 4,003,259 A | | 1/1977 | Hope |
| 4,295,370 A | | 10/1981 | Bristol |
| 4,383,444 A | | 5/1983 | Beaman |
| 4,840,137 A | | 6/1989 | Beauvais |
| 5,565,851 A | | 10/1996 | Richards |
| 5,613,399 A | * | 3/1997 | Hannan et al. ............ 73/304 C |
| 5,747,689 A | * | 5/1998 | Hampo et al. ............. 73/304 C |
| 6,016,113 A | | 1/2000 | Binder |
| 6,337,959 B1 | * | 1/2002 | Kwak et al. .................. 399/57 |
| 6,364,168 B1 | | 4/2002 | Gardner |
| 6,422,439 B1 | | 7/2002 | Kelliher |
| 6,472,887 B1 | | 10/2002 | Tullis |
| 6,598,770 B2 | | 7/2003 | Bolts |
| 6,658,929 B2 | * | 12/2003 | Atkinson ................ 73/149 |

OTHER PUBLICATIONS

Quantum Research Group Ltd, QProx QT114 Charge-–Transfer QLevel Sensor IC, 1999.

* cited by examiner

Primary Examiner—Michael Cygan

(57) ABSTRACT

A liquid level measuring system for a personal hydration pack using capacitive sensing pads located outside of the reservoir. Variation in the liquid level due to movement of the pack is used advantageously to increase the resolution of the measurement. An indicator shows both the liquid level and the time remaining before reservoir depletion.

19 Claims, 3 Drawing Sheets

LIQUID LEVEL INDICATOR

CROSS-REFERENCE TO RELATED APPLICATIONS

Not applicable

FEDERALLY SPONSORED RESEARCH

Not applicable

SEQUENCE LISTING OR PROGRAM

Not applicable

FIELD OF THE INVENTION

This invention relates to liquid level indicators, and more particularly to liquid level indicators for personal hydration systems.

BACKGROUND OF THE INVENTION

During strenuous physical activity, the human body requires a significant amount of fluid replenishment to replace lost fluids, in order to prevent dehydration. It is preferable for a person to be able to consume a small amount of fluid frequently while continuing to perform the activity, rather than having to stop the activity periodically to consume a larger amount of fluid. Hydration packs such as those disclosed in U.S. Pat. Nos. 6,364,168 and 6,422,439 have been developed to allow frequent replenishment. They contain a flexible reservoir with up to several liters of fluid, and a flexible hose allowing the wearer to drink without interrupting their activity.

There are a large variety of devices known in the art for carrying standard bicycle water bottles. These are typically worn on a person's belt or attached to a standard backpack. There are also other types of reservoir carriers, such as the the Beverage Container Belt disclosed in U.S. Pat. No. 6,598,770. For longer periods of activity, a hydration pack is often preferred over these devices, due to its larger capacity. Hydration packs are commonly available that contain up to 3 liters of fluid, whereas bicycle water bottles typically contain no more than 1 liter.

The hydration pack may be worn by a person hiking in a remote area without a nearby potable water supply, requiring the reservoir to contain enough fluid for the entire hike. The hiker must ration the fluid to insure it does not run out prematurely. This is typically accomplished by controlling how often, as well as how much fluid is consumed, each time a drink is taken.

A disadvantage of hydration packs of the current art is a lack of any indication of the amount of fluid remaining in the reservoir. The pack is normally worn on a person's back, with the reservoir contained entirely inside of the pack, requiring the person to stop their activity, then remove and open up the pack in order to visually examine the liquid level. Although the weight of the pack will change as liquid is consumed, this is not a reliable gauge of remaining liquid, especially for an inexperienced user of the hydration pack.

Another disadvantage is an inability to indicate how much time the remaining fluid is expected to last, or to provide advance warning when it is about to run out.

There is a broad range of techniques for measuring fluid level. Many require mechanical devices such as floats installed in contact with the fluid. Others sense properties of the fluid using probes that are in direct contact with it, such as the impedance sensing technique disclosed in U.S. Pat. No. 5,565,851. Still others use techniques not requiring direct contact with the fluid, such as the optical technique disclosed in U.S. Pat. No. 4,840,137, and the capacitance measurement methods of U.S. Pat. Nos. 4,295,370 and 6,472,887.

The capacitance method is frequently employed, due to the possibility of using sensors that are not in contact with the fluid and therefore not subject to contamination by the fluid. The current art includes methods with sensors exhibiting a continuous capacitance change proportional to fluid level, as disclosed in U.S. Pat. No. 4,383,444; as well as methods with multiple sensors to detect for the presence of fluid at several discrete levels, as disclosed in U.S. Pat. No. 4,003,259.

A disadvantage of continuous capacitance methods of the current art is their inability to compensate for changes in ambient capacitance, such as changes in location of objects in proximity to the sensor, without requiring electrostatic shielding or other methods which increase the cost of the system.

A disadvantage of discrete capacitance methods of the current art is the inability to resolve more liquid levels than the number of electrodes in the system.

Another disadvantage of discrete capacitance methods is the necessity of filtering out variations in measured liquid level due to movement of the reservoir, such as is disclosed in "QProx QT114 Charge-Transfer QLevel Sensor IC" Data Sheet.

A technique known in the art as dithering may be used to increase resolution of an analog signal, as disclosed in U.S. Pat. No. 6,016,113.

BRIEF SUMMARY OF THE INVENTION

One object of the present invention is to provide a system of measuring and displaying the fluid level contained in a hydration pack, to prevent a person from running out of fluid unexpectedly.

Another object of the invention is to allow the measurement set forth above to be made without requiring any objects to be placed inside or through the walls of the fluid reservoir.

Yet another object of the invention is to allow the system to be used with an existing hydration pack of any size without making any modifications to the reservoir.

A further object of the invention is to provide the measurement set forth above with increased resolution while the hydration pack is moving as it is being carried by a person.

A further object of the invention is to provide an estimate of the remaining time before the reservoir becomes empty.

The above objects are accomplished by providing a capacitance-based liquid level measuring system with multiple sensing locations. A circuit measures the capacitance between multiple sensing pads, which are positioned along a thin strip of flexible material in close proximity to the outside of one side of the reservoir. The capacitance measured between a selected pad and all other nonselected pads will vary depending on whether the liquid level is above or below the pad. The pads are equally spaced along the strip, and an additional pad is placed at the top of the strip above the maximum liquid level.

The level indication is determined by selecting each pad in sequence and measuring its capacitance, then computing the difference between each pair of adjacent measurements. The air/liquid boundary will be given by the pair of measurements showing the largest difference. If the boundary is very close to one of the sensing pads, the measurement will vary as the liquid moves around within the reservoir while the pack is being carried; otherwise, if the boundary is between a pair of pads, the measurement will stay constant. This information allows the number of possible boundary location indications to be twice the number of sensing pads. This indication is then provided to the person wearing the pack.

The change in level indication over time is used to compute an estimate of the time remaining before the reservoir becomes empty, and this information is also provided to the wearer.

Other features and advantages of this invention will be apparent from the following detailed description together with the accompanying drawings.

DETAILED DESCRIPTION OF THE PREFERRED EMBODIMENT

Figure 1:
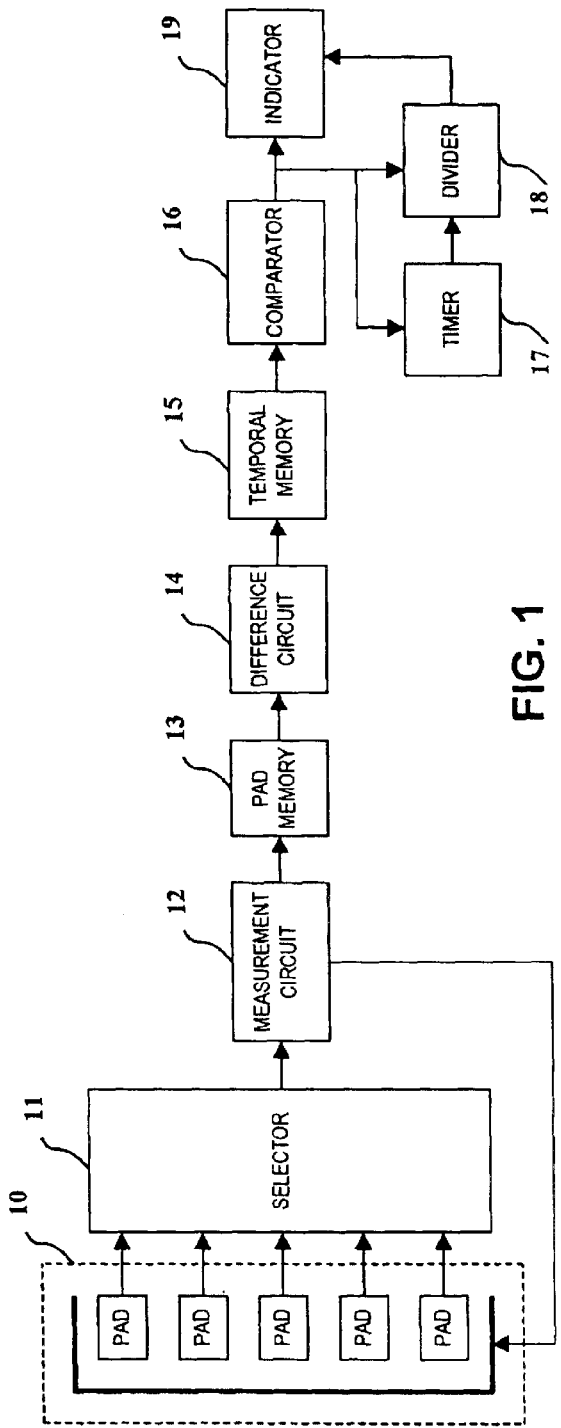
FIG. 1 is a block diagram of the preferred embodiment of the present invention.

FIG. 1 shows a liquid level measurement system according to the present invention. Sensing strip 10 is connected through selector 11 to measurement circuit 12, which measures the capacitance of the selected pad, and supplies the resulting value to a location in pad memory 13 corresponding to the selected pad. The values from memory 13 are fed through difference circuit 14 to temporal memory 15, which stores several sets of values in sequence, acting as a shift register. Memory 15 supplies its data to comparator 16, which then connects to timer 17 and divider 18, as well as indicator 19.

Figure 2:
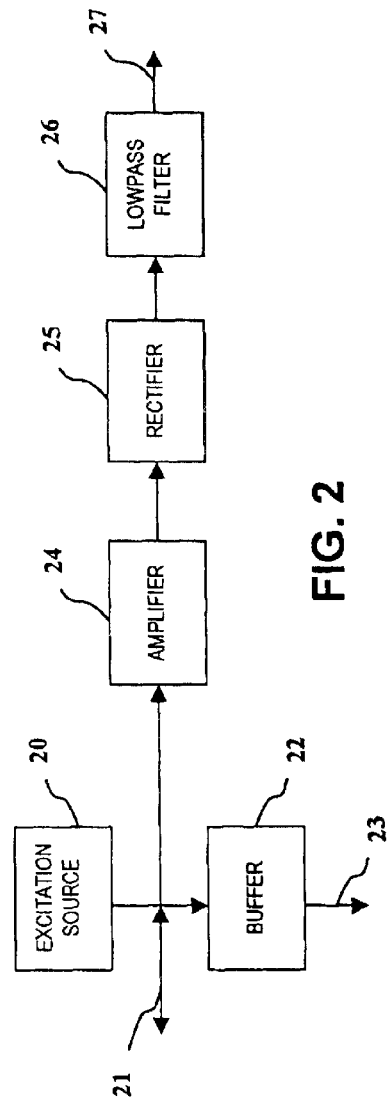
FIG. 2 is a block diagram of the measurement circuit of FIG. 1.

FIG. 2 shows the details of circuit 12. Excitation source 20 supplies a sinusoidal waveform to the measurement node 21. The output impedance of source 20 is sufficiently high so that the signal present at node 21 will vary depending on the externally presented impedance. This signal is fed through buffer 22 to shield node 23. The signal is also fed through amplifier 24, rectifier 25, and low-pass filter 26. This results in a DC value at node 27 which varies with the capacitance present at node 21.

Figure 3:
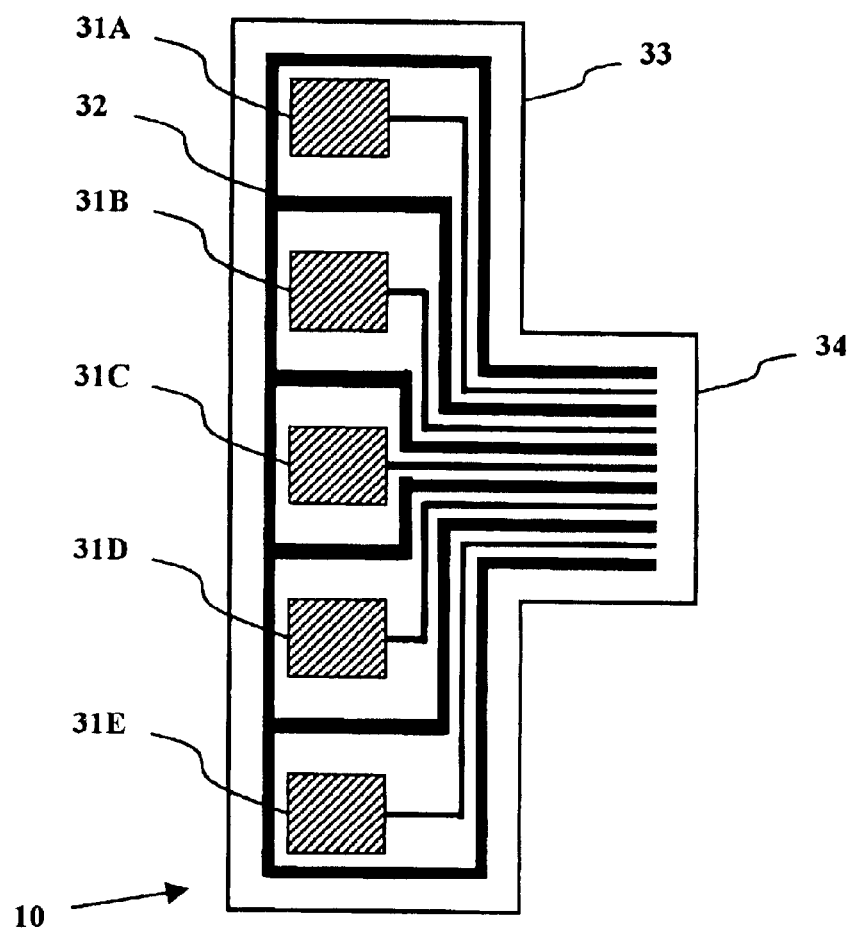
FIG. 3 is a plan view of the sensing strip showing the individual pads.

FIG. 3 shows strip 10 with sensing pads 31A through 31E formed out of conductive material placed on a piece of flexible insulating material 33. The pads may be produced using any of various techniques known in the art, such as copper applied to a flexible printed circuit board or conductive ink printed on a flexible membrane. Each sensing pad is of the same size, and the spacing between pads is constant. A conductive trace runs from each pad to an extended area 34 of the insulating material, to provide for connection to selector 11. The total area covered by each of the traces is the same, to minimize the difference in capacitance between the traces and the fluid. In order to reduce interaction between adjacent pads, a shield trace 32 is run between each pair of pads and traces.

Figure 4:
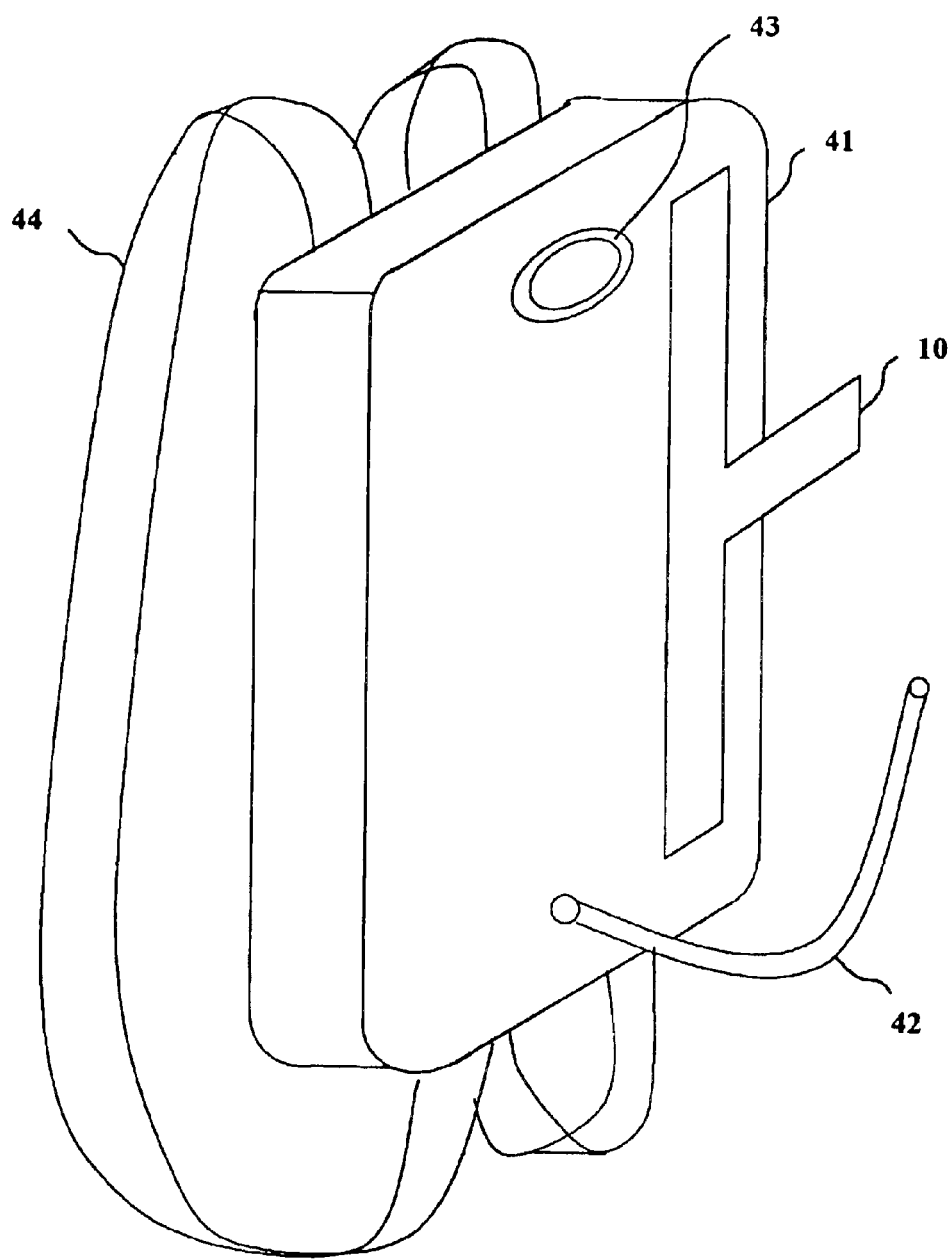
FIG. 4 is an isometric view of a reservoir with sensing strip attached.

FIG. 4 shows strip 10 affixed vertically along the outside of reservoir 41, with the topmost pad above fill opening 43, above the highest possible liquid level. One end of flexible hose 42 is secured near the bottom of reservoir 41, and carrying straps 44 allow the reservoir to be carried on a person's back.

Selector 11 cycles through each of the pads 31A through 31E, connecting one at a time to measurement circuit 12, and connecting all other pads to ground. Circuit 12 measures the capacitance between the selected pad and all other grounded pads, and the result is stored in a location in pad memory 13 corresponding to the selected pad. During the measurement, circuit 12 drives shield trace 32 with a voltage corresponding to the value measured at the selected pad. This reduces the capacitance effect of the traces, while not significantly affecting the measurement of the capacitance of the fluid.

After selector 11 has cycled once through all of the pads and filled up memory 13, difference circuit 14 computes the capacitance difference between each pair of memory 13 values. For each pair of pads, if the liquid is either above or below both pads, the difference will be small. If the liquid is above only one of the pads, the difference will be large. The actual difference value will vary due to a number of factors, including the properties of the liquid and the reservoir material, movement and changes in shape of the reservoir, and variation of position of objects near the sensing pads. The largest of the differences represents the location of the air/liquid boundary.

Whenever the reservoir is being carried by a person, the water will be moving around, possibly producing varying indications of the location of the air/liquid boundary. The present location of the boundary is stored in temporal memory 15, which is able to store the boundary locations for several past measurements, typically over the course of several seconds. Comparator 16 compares all of these past locations, to determine whether the location varies or is constant over those several seconds.

If the location is constant, comparator 16 assumes the actual liquid level is halfway between the corresponding pair of sensing pads. If it varies between two adjacent locations, the level is assumed to be centered on the pad that is a member of both pad pairs. If it varies between more than two locations, or two non-adjacent locations, then the locations of the highest and lowest pad pairs are averaged to determine the actual level.

As liquid is consumed and the level drops, timer 17 tracks the average time required to consume the fixed quantity of liquid represented by one increment of level indication. Divider 18 then divides the liquid level by this average time, to compute the estimated time remaining before the liquid is exhausted.

Indicator 19 displays the actual liquid level, as well as the estimated time remaining. The display is mounted in a location visible to the person wearing the hydration pack, such as on a shoulder strap.

While this invention has been described with reference to the described embodiment, this description is not intended to be construed in a limiting sense. Various modifications of the illustrative embodiment, such as using a different number of sensing pads, or integrating a majority of the functional blocks into a microcontroller, as well as other embodiments of the invention, which are apparent to persons skilled in the art to which the invention pertains, are deemed to lie within the spirit and scope of the invention.

I claim:

1. A liquid level measurement system comprising:
a reservoir for containing liquid, said reservoir being subject to frequent movement sufficient to cause variation of the location of the air/liquid boundary within said reservoir;

a plurality of sensors disposed along the vertical dimension of said reservoir for detecting the presence of liquid adjacent to each of said sensors;

means for determining the vertical location of said air/liquid boundary based on which of said plurality of sensors have detected the presence of liquid; and means for determining the quantity of liquid in said reservoir given said vertical location and the variation of said vertical location over time resulting from said movement.

2. The system of claim 1, wherein said sensors are disposed approximately equidistant along said vertical dimension.

3. The system of claim 2, wherein said sensors comprise capacitive sensors.

4. The system of claim 3, wherein said system further comprises:

carrying means to allow said system to be carried by a person;

a flexible hose with a first end attached to said reservoir and a second end disposed to supply liquid to the mouth of said person; and indicating means to indicate said quantity of liquid to said person, said indicating means being visible to said person while said reservoir is being carried by said carrying means.

5. A liquid level measurement method comprising the steps of:

sensing the presence of liquid in a reservoir at a plurality of locations along the vertical dimension of said reservoir, said reservoir being subject to frequent movement sufficient to cause variation of the location of the air/liquid boundary within said reservoir;

determining the vertical location of said air/liquid boundary based on which of said plurality of locations have resulted in the sensing of said presence of liquid; and determining the quantity of liquid in said reservoir given said vertical location and the variation of said vertical location over time resulting from said movement.

6. The method of claim 5, wherein said sensing is performed at approximately equidistant points along the vertical dimension of said reservoir.

7. The method of claim 6, wherein said sensing comprises capacitive sensing.

8. The method of claim 7, wherein said method further comprises:

providing for said reservoir to be carried by a person;

providing for said person to drink liquid contained in said reservoir; and indicating said quantity of liquid to said person.

9. A personal liquid carrier, comprising:

a reservoir for containing a quantity of liquid;

a flexible hose with a first end attached to said reservoir and a second end disposed to supply liquid to the mouth of said person;

carrying means to support said reservoir and said flexible hose on said person's body;

level measurement means to measure the level of liquid in said reservoir, said level measurement means comprising a capacitance measurement means; and indicating means to provide the results of said level measurement means to said person.

10. The personal liquid carrier of claim 9, wherein said level measurement means is external to said reservoir.

11. The personal liquid carrier of claim 10, wherein said capacitance measurement means comprises a plurality of sensor locations disposed along the vertical dimension of said reservoir.

12. The personal liquid carrier of claim 11, wherein said sensor locations are disposed approximately equidistant along said vertical dimension.

13. The personal liquid carrier of claim 11, wherein said capacitance measurement means further comprises:

selection means for selecting each of said sensor locations one at a time;

grounding means for connecting all of said sensor locations other than said sensor location selected by said selection means to the common ground signal of said capacitance measurement means;

capacitance determination means for determining the capacitance value between said sensor location selected by said selection means and said common ground signal;

memory means for storing said capacitance values for each of said sensor locations; and comparison means for comparing said capacitance values to determine the location of the air/liquid boundary in said reservoir.

14. The personal liquid carrier of claim 13, wherein said comparison means comprises:

means for determining the difference between capacitance values corresponding to each pair of adjacent ones of said sensor locations; and means for determining the largest of said differences.

15. The personal liquid carrier of claim 14, wherein said capacitance measurement means further comprises means for detecting variations in the result of said comparison means resulting from movement of liquid within said reservoir, in order to determine whether said air/liquid boundary is proximate to one of said sensor locations or in between a pair of said sensor locations.

16. The personal liquid carrier of claim 15, wherein said indicating means is visible to said person without removing said reservoir from said carrying means.

17. A personal liquid carrier, comprising:

a reservoir for containing a quantity of liquid;

a flexible hose with a first end attached to said reservoir and a second end disposed to supply liquid to the mouth of a person;

carrying means to support said reservoir and said flexible hose on said person's body;

level measurement means to measure the level of liquid in said reservoir; and indicating means to provide to said person the results of said level measurement means and an estimated time remaining before said reservoir becomes empty.

18. The personal liquid carrier of claim 17, wherein said level measurement means comprises a capacitance measurement means.

19. The personal liquid carrier of claim 18, wherein said indicating means is visible to said person without removing said reservoir from said carrying means.

* * * * *